United States Patent
Weber et al.

(10) Patent No.: US 11,649,006 B2
(45) Date of Patent: May 16, 2023

(54) THREE-WHEELED POWER DRIFT SCOOTER

(71) Applicant: DGL Group Ltd., Edison, NJ (US)

(72) Inventors: Charles Weber, Chicago, IL (US); Collin Ostergaard, Chicago, IL (US)

(*) Notice: Subject to any disclaimer, the term of this patent is extended or adjusted under 35 U.S.C. 154(b) by 273 days.

(21) Appl. No.: 16/994,122

(22) Filed: Aug. 14, 2020

(65) Prior Publication Data

US 2021/0061397 A1 Mar. 4, 2021

Related U.S. Application Data

(60) Provisional application No. 62/887,668, filed on Aug. 15, 2019.

(51) Int. Cl.
*B62K 5/08* (2006.01)
*B62K 15/00* (2006.01)
*B62J 25/04* (2020.01)
*B62K 23/08* (2006.01)

(52) U.S. Cl.
CPC ............. *B62K 5/08* (2013.01); *B62J 25/04* (2020.02); *B62K 15/006* (2013.01); *B62K 23/08* (2013.01); *B62K 15/00* (2013.01); *B62K 2202/00* (2013.01)

(58) Field of Classification Search
CPC ........ B62K 5/08; B62K 15/006; B62K 23/08; B62K 15/00; B62K 2202/00; B62K 5/02; B62J 25/04
USPC ........................................................ 180/211
See application file for complete search history.

(56) References Cited

U.S. PATENT DOCUMENTS

| | | | | |
|---|---|---|---|---|
| 4,093,252 A * | 6/1978 | Rue | ......................... | B62K 3/002 280/87.042 |
| 4,540,192 A * | 9/1985 | Shelton | ................... | B62K 3/002 280/282 |
| 7,549,655 B2 * | 6/2009 | Fan | ........................... | B62K 5/02 280/87.041 |
| 9,873,475 B2 * | 1/2018 | Baron | ..................... | B62K 21/12 |
| 2016/0229485 A1 * | 8/2016 | Hadley | .................... | B62M 6/60 |

(Continued)

FOREIGN PATENT DOCUMENTS

| | | |
|---|---|---|
| RU | 62 887 U1 | 5/2007 |
| RU | 165 387 U1 | 10/2016 |
| WO | 2015/091074 A1 | 6/2015 |

OTHER PUBLICATIONS

Notification of Transmittal of the International Search Report and the Written Opinion issued by the International Searching Authority for corresponding International Patent Application No. PCT/US2020/046490, dated Oct. 22, 2020.

(Continued)

*Primary Examiner* — John D Walters
*Assistant Examiner* — Hilary L Johns
(74) *Attorney, Agent, or Firm* — Myers Wolin, LLC

(57) ABSTRACT

An embodiment of the present disclosure may provide a drift scooter, including: handlebars operatively coupled to a front wheel and mounted from a scooter body; first and second legs extending from the scooter body; first and second castered rear wheels mounted from the respective first and second legs; and first and second foot platforms operatively coupled with the respective first and second castered rear wheels wherein the first and second foot platforms pivot. The first and second rear wheels are adjusted in response to pivoting of the respective first and second foot platforms.

18 Claims, 24 Drawing Sheets

(56) References Cited

U.S. PATENT DOCUMENTS

2017/0088224 A1* 3/2017 Baron ................... B62K 5/06
2019/0092387 A1* 3/2019 Ying ................... B62K 11/007

OTHER PUBLICATIONS

EGGalaxy Children Frog Scooter with Height. Aug. 8, 2015; [online] <https://www.youtube.com/watch?v=HTkcjt-vb0>, Retrieved from Internet on Oct. 16, 2020.

EGGalaxy Children Frog Scooter with Height. Aug. 8, 2015; [online] https://www.youtube.com/watch?v=ybtatx6OYzo, Retrieved from the Internet on Feb. 18, 2021.

* cited by examiner

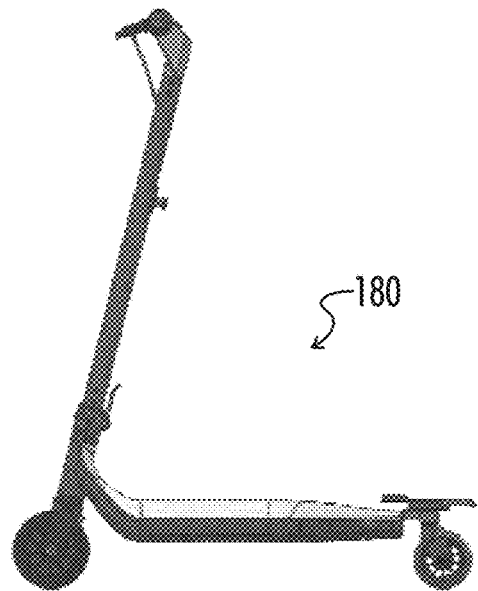
*FIG. 21*
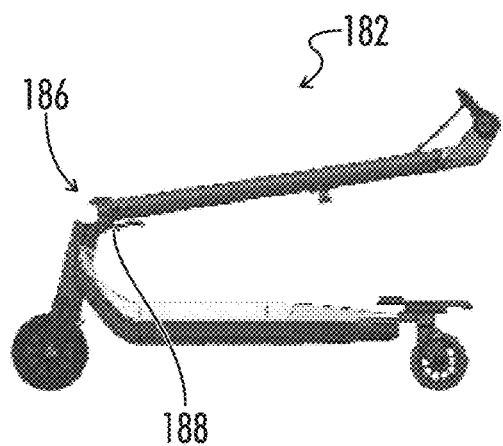 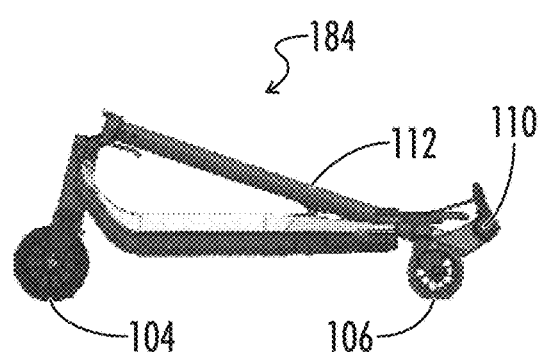
*FIG. 22*  *FIG. 23*

THREE-WHEELED POWER DRIFT SCOOTER

CROSS-REFERENCE TO RELATED APPLICATIONS

This application claims the benefit of U.S. Provisional Application No. 62/887,668, filed Aug. 15, 2019, the contents of which are incorporated by reference herein.

TECHNICAL FIELD

The present subject matter relates to motorized scooters, and more particularly, to electric scooters with three wheels.

BACKGROUND

Conventionally, a self-centering caster is understood. However, application of self-centering casters to three-wheeled scooters with a motor represent an improvement in the art. Further, rotating footpads for operation of the scooter and the self-centering wheels is a still further improvement in the art.

The description provided in the background section should not be assumed to be prior art merely because it is mentioned in or associated with the background section. The background section may include information that describes one or more aspects of the subject technology.

SUMMARY

An embodiment of the present disclosure may provide a drift scooter, including: handlebars operatively coupled to a front wheel and mounted from a scooter body; first and second legs extending from the scooter body; first and second castered rear wheels mounted from the respective first and second legs; and first and second foot platforms operatively coupled with the respective first and second castered rear wheels wherein the first and second foot platforms pivot. The first and second rear wheels are adjusted in response to pivoting of the respective first and second foot platforms.

In one embodiment, at least one of the first and second foot platforms pivots from an initial forward position by more than 60 degrees about a pivot axis in a clockwise direction.

In one embodiment, the at least one of the first and second foot platforms pivots from the initial forward position by more than 80 degrees about the pivot axis in the clockwise direction.

In one embodiment, the at least one of the first and second foot platforms pivots from the initial forward position by more than 60 degrees about the pivot axis in a counterclockwise direction.

In one embodiment, the at least one of the first and second foot platforms pivots from the initial forward position by more than 80 degrees about the pivot axis in the counterclockwise direction.

In one embodiment, the scooter further includes one or more springs that forces one of the first and second foot platforms to return to an initial forward position from a first turned position in a side of one direction of a clockwise direction and a counterclockwise direction.

In one embodiment, the one or more springs forces the one of the first and second foot platforms to return to the initial forward position from a second turned position in a side of the other direction of the clockwise direction and the counterclockwise direction.

In one embodiment, the one or more springs are disposed under the one of the first and second foot platforms.

In one embodiment, a cavity is formed inside the one of the first and second foot platforms, and the one or more springs are disposed in the cavity.

In one embodiment, the scooter further includes a motor operably coupled with the front wheel.

In one embodiment, a distance from the first leg to the second leg is kept constant during pivoting of the respective first and second foot platforms.

In one embodiment, a pivot axis about which the first foot platform pivots overlap with the first rear wheel in a plan view.

In one embodiment, one of the first foot platform pivots symmetrically from an initial forward position in a clockwise direction and in a counterclockwise direction.

In one embodiment, at least one of the first and second foot platforms includes a wedge shaped front edge.

In one embodiment, the wedge shaped front edge is raised relative to a surface of the corresponding platform and forms a partial boundary of the surface.

In one embodiment, each of the first and second foot platforms further includes two sidewalls raised relative to a surface of the corresponding platform. The two sidewalls are on opposite sides of the corresponding platforms, thereby forming a partial boundary restrict lateral movement on the platform.

In one embodiment, pivot range of each of the first and second foot platforms is not obstructed by the corresponding first or second leg.

In one embodiment, a hypothetical extension of each of the first and second legs intersects a pivot axis of the corresponding first and second castered rear wheel.

In one embodiment, the handlebar is fixed relative to the front wheel by a shaft. The shaft is vertical in a riding configuration. The shaft pivots relative to the front wheel to a storage configuration. In the storage configuration, the handlebar is located between the first and second rear wheels.

Another embodiment of the present disclosure may provide a method of maneuvering a scooter including: adjusting a first one or more wheel having self-centering casters; adjusting a second one or more wheel with a handlebar; and combining adjusting of the first and second one or more wheel to drift.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 21-23 illustrate elevational views of the drift scooter of FIG. 1 in a riding position, an intermediate position, and a folded position;

Figure 1:
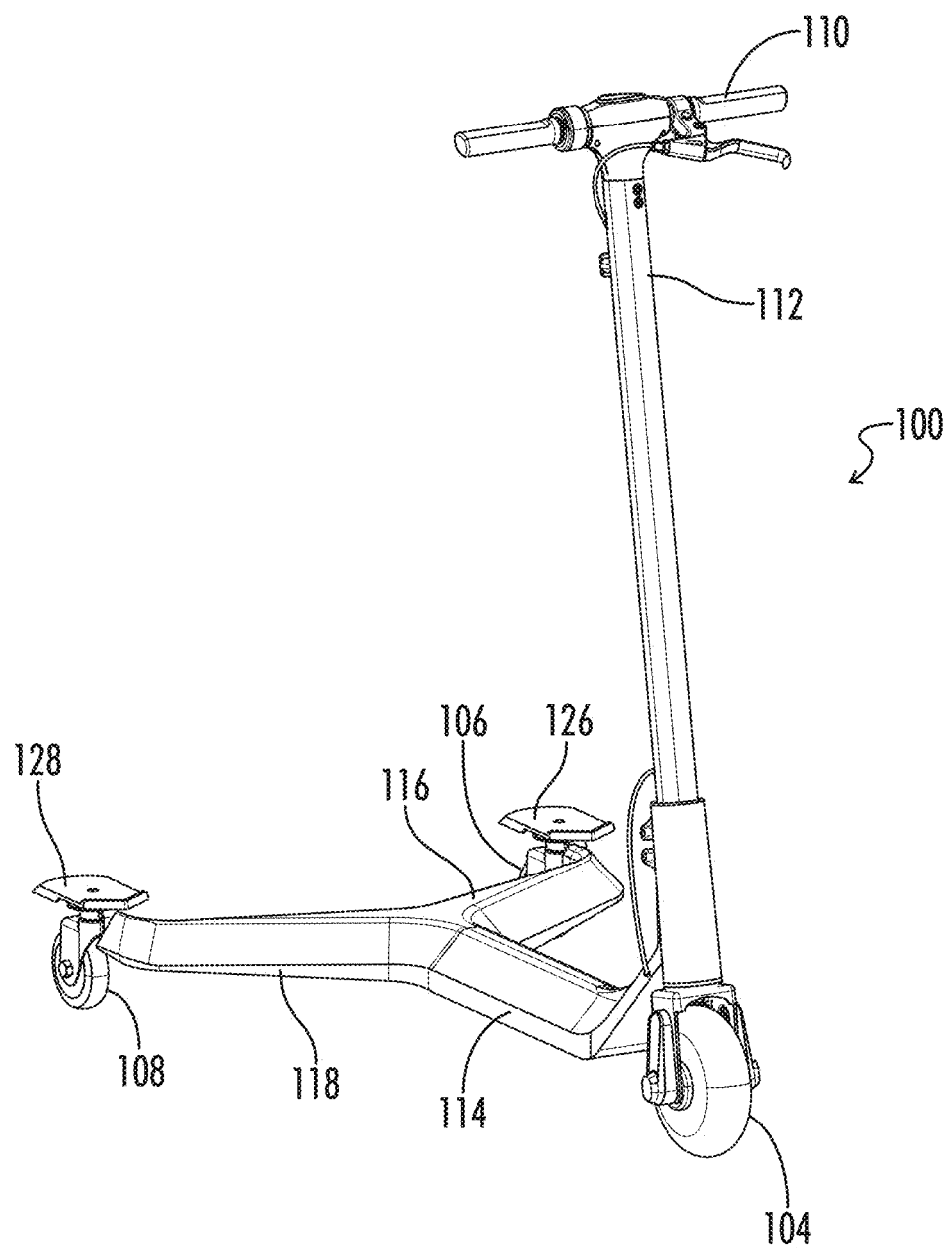
FIG. 1 illustrates a front isometric view of a drift scooter comprising a front wheel and two rear wheels and a motor operably coupled with the front wheel.
Figure 2:
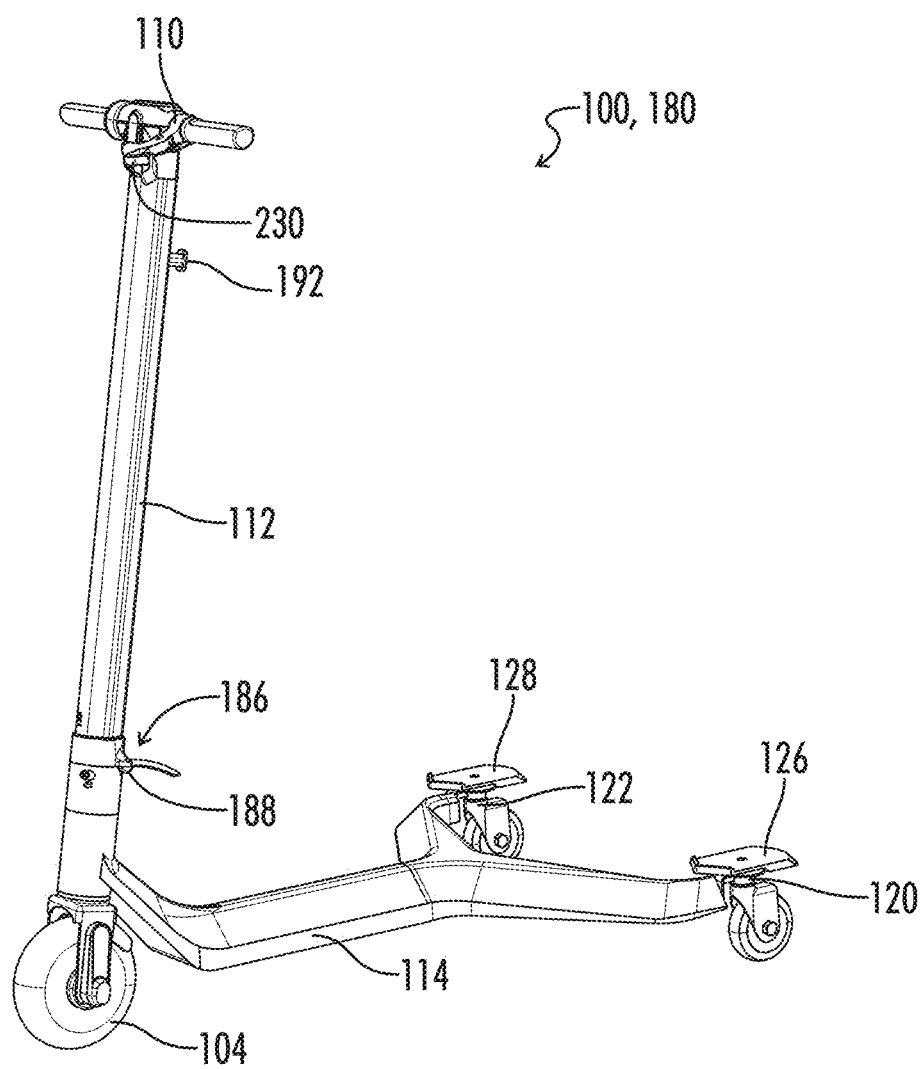
FIG. 2 illustrates a side isometric view of the drift scooter of FIG. 1.
Figure 3:
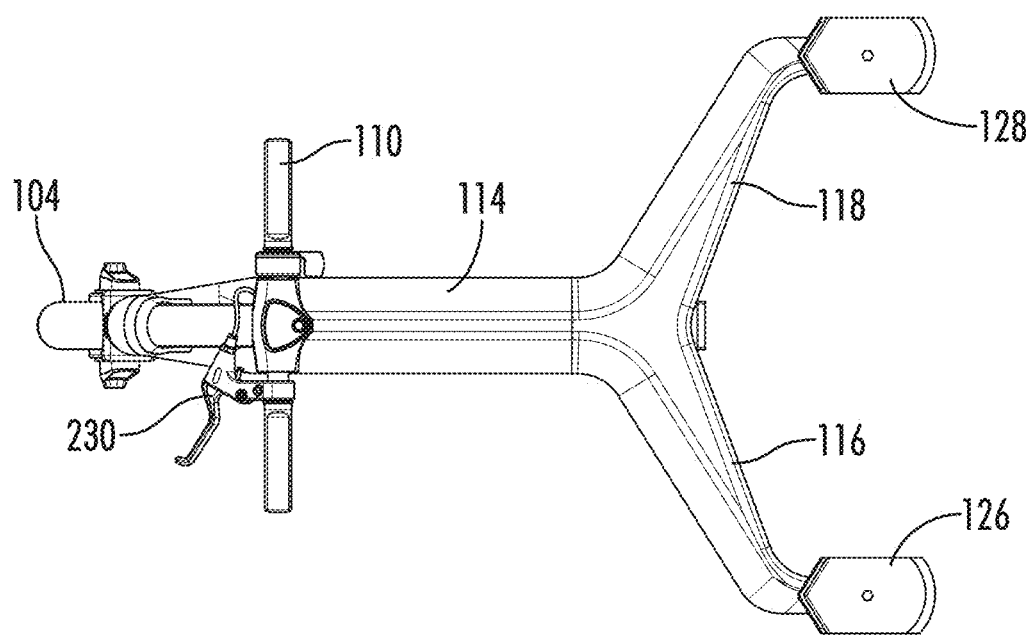
FIG. 3 illustrates a top plan view of the drift scooter of FIG. 1.
Figure 4:
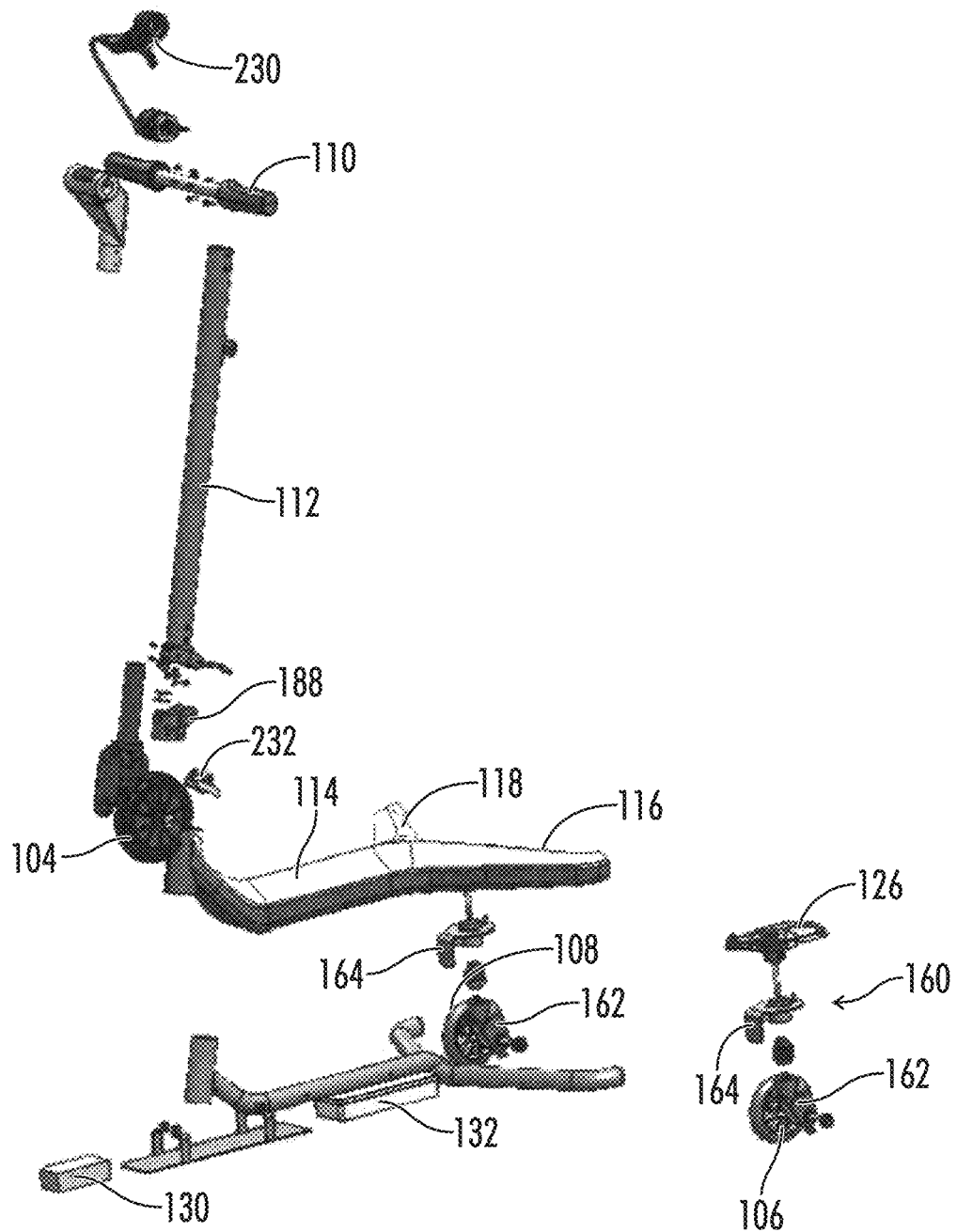
FIG. 4 illustrates an exploded side isometric view of the drift scooter of FIG. 1.
Figure 5:
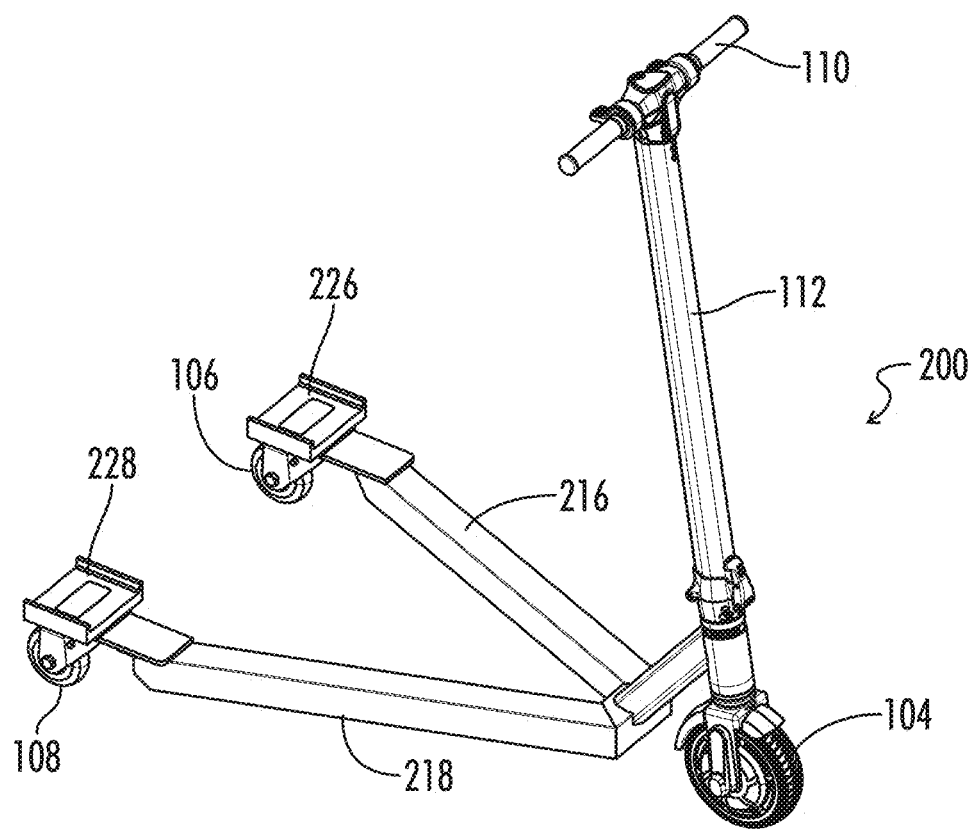
FIG. 5 depicts another embodiment of the drift scooter in an isometric view from above.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Generally, this disclosure describes a drift scooter that is a three-wheeled ride-on vehicle with an electric motor on the front wheel. A handlebar is provided to turn the front wheel. The drift scooter has two fixed platforms extending from the head tube in a v-shaped configuration. Self-centering casters are provided at the end of each platform. Additionally, pivoting foot holders are provided on each platform, and each foot holder is keyed to the caster shaft so that the caster rotates when the foot holders are pivoted. FIGS. 1-31 illustrate a drift scooter apparatus 100 and a method for maneuvering the drift scooter apparatus 102.

Referring now to FIGS. 1-4, the drift scooter 100 comprises a front wheel 104 and first and second rear wheels 106, 108. A motor is operably coupled with the front wheel 104. The motor may be electric and/or combustion. Further, a handlebar 110 is mounted on a vertical shaft 112 operably coupling the handlebar 110 to the front wheel 104 such that turning of the handlebar 110 by a rider operates to turn the front wheel 104. A drift scooter body 114 connects the front wheel 104 and handlebar 110 to first and second rear legs 116, 118 whereupon the first and second rear wheels 106, 108 are mounted by first and second rear castering mechanisms 120, 122 (see FIGS. 15-21 detailed views). Additionally, first and second foot platforms 126, 128 are disposed in operable connection with the first and second rear castering mechanisms 120, 122 and the first and second rear wheels 106, 108 such that turning one or both of the foot platforms 126, 128 by a rider operates to turn the associated one, or both, of the first and second rear wheels 106, 108.

Referring now to FIGS. 5-14, an example embodiment of a drift scooter 200 is shown with a shortened drift scooter body 214 and extended first and second rear legs 216, 218 leading to the first and second rear wheels 106, 108. Additionally, the drift scooter 200 of this example embodiment comprises first and second foot platforms 226, 228 having a shape different from that shown in the drift scooter 100 of FIGS. 1-4 and 15-30. The example embodiment of the drift scooter 200 may omit a motor controller 130 and battery 132 (see FIGS. 4, 28, and 29) included in the drift scooter 100. The battery 132 may be a lithium ion battery or another suitable power source. It will be understood that while the drift scooter 200 shown may omit the motor controller and battery, it may also include a motor controller, motor, and battery, arranged in a different configuration than that shown in the first example of the drift scooter 100. For example, in the second example, the motor control and battery may be located in the vertical shaft 112 rather than in a body.

FIGS. 8-14 illustrate examples maneuverability of the drift scooter 100, 200. Operation of the handlebar 110 and the first and second foot platforms 126, 128; 226, 228 is substantially identical for both embodiments of the drift scooter 100, 200. Therefore, for brevity and clarity, methods of maneuvering the drift scooter will be described only with respect to the drift scooter 200 example shown in FIGS. 8-14. Features and maneuverability operations of the drift scooter embodiments 100, 200 may be combined in full or in part without departing from the spirit of this disclosure. Similarly, turning and/or pivoting motions of the first and second foot platforms 126, 128; 226, 228, and the first and second rear wheels 106, 108 associated therewith operate according to substantially identical principles. Therefore, once again, operation of only one side or the other is described hereinbelow in the interest of brevity and accuracy.

Referring once again to FIG. 7 the right foot platform 228 is depicted as generally arranged in an initial, forward position 134. A rider may pivot one or both of the foot platforms 226, 228 to effect turning, tight turning, drifting, and or other maneuverability operations. FIG. 8 depicts the right foot platform 228 of FIG. 7 generally arranged in an outwardly angled position 136, while FIG. 9 depicts the right foot platform 228 of FIG. 7 generally arranged in an inwardly angled position 138. Outwardly and inwardly angled positions 140, 142 of the left foot platform 226 are understandably reversed for arrangement on an opposite side.

Figure 6:
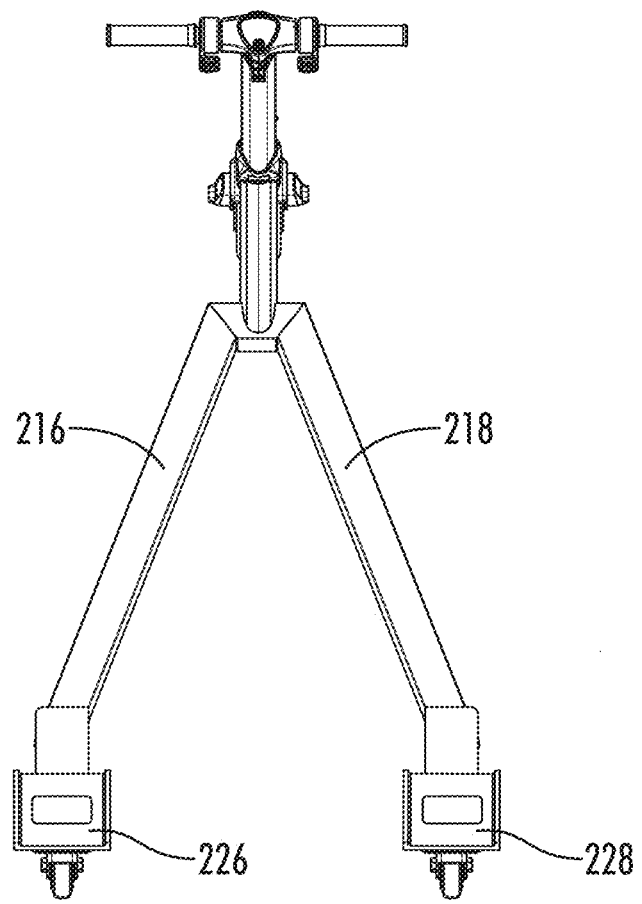
FIG. 6 depicts the drift scooter of FIG. 5 in a rear isometric view.
Figure 7:
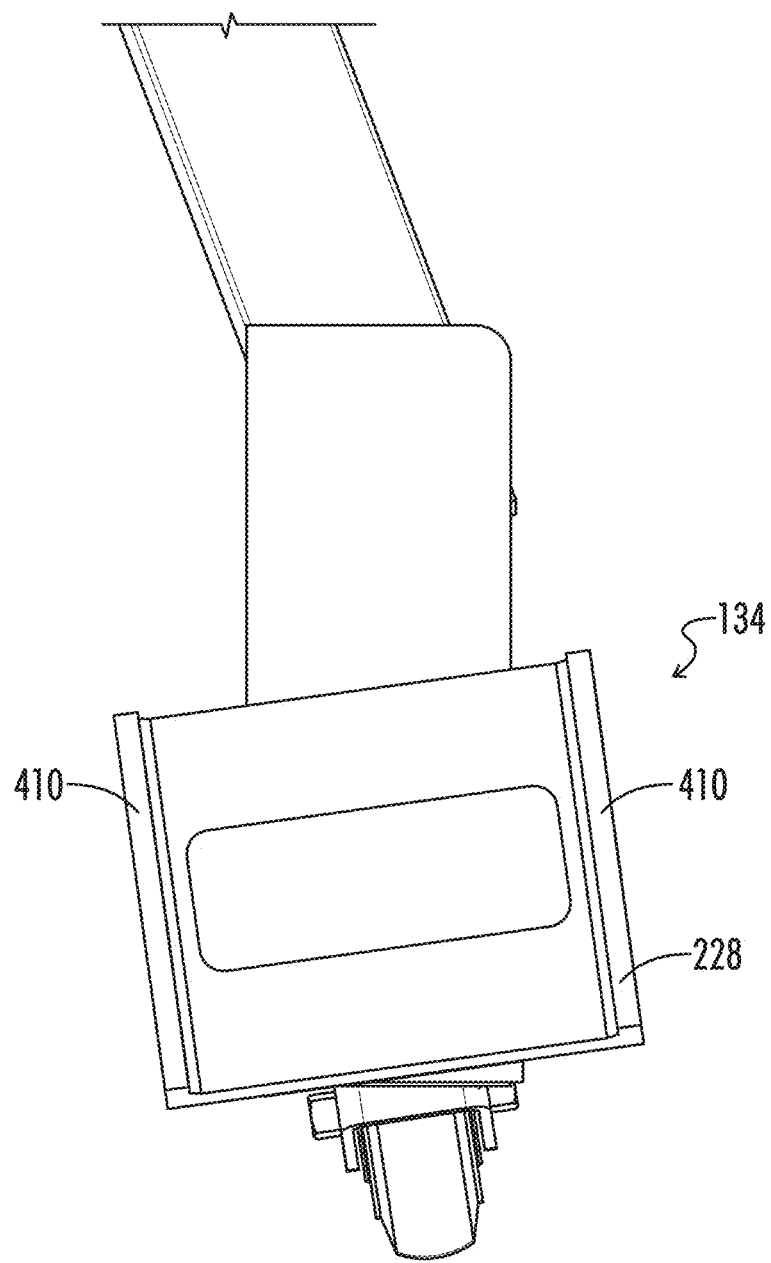
FIG. 7 depicts an enlarged view of a foot platform, for the drift scooter of FIG. 5, generally arranged in an initial, forward position.
Figure 8:
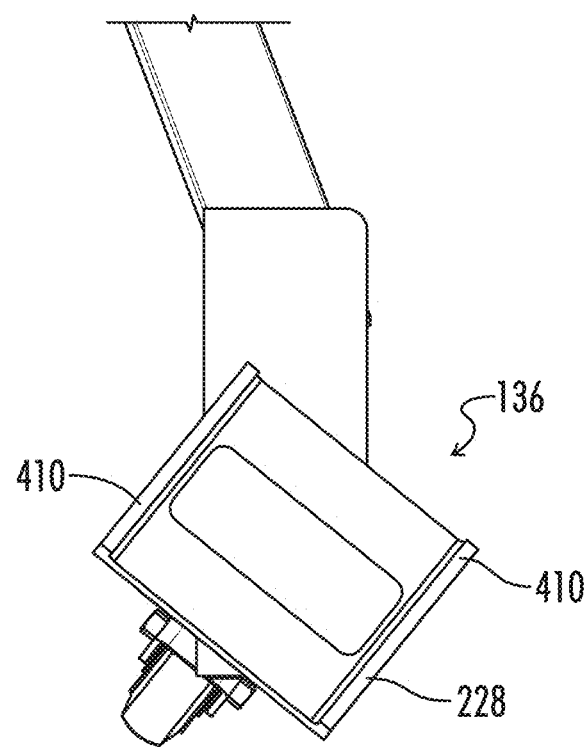
FIG. 8 depicts an enlarged view of the foot platform of FIG. 7 generally arranged in an outwardly angled position.
Figure 9:
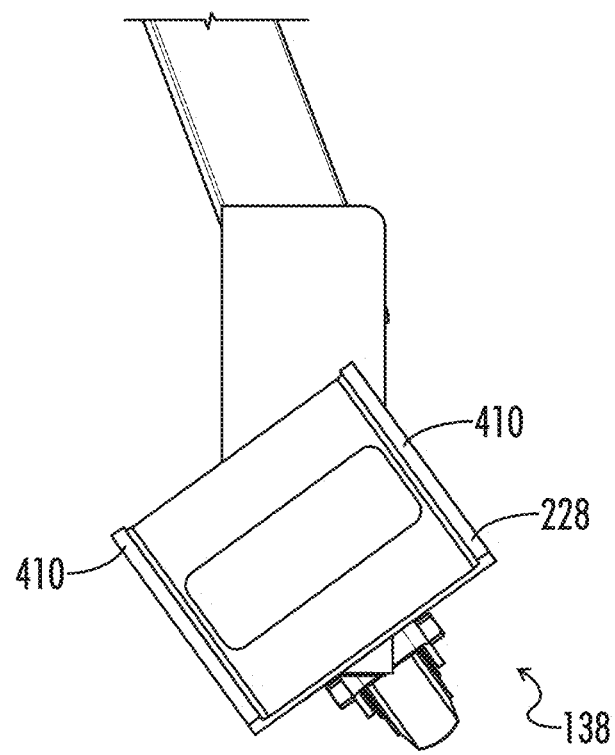
FIG. 9 depicts an enlarged view of the foot platform of FIG. 7 generally arranged in an inwardly angled position.

As shown in FIGS. 6-8, each of the foot platforms 226, 228 may be provided with two sidewalls 410 raised relative to a surface of the corresponding platform. The two sidewalls 410 may then be located on opposite sides of the corresponding platform 226, 228, such as to form a partial boundary restricting lateral movement on the platform. These sidewalls allow the foot to move front to back so that the rider can find a comfortable balance, but so that the riders feet would not rotate relative to the platform. Other structures are also contemplated for fixing rotation of the foot relative to the platform, and similarly for fixing rotation of the foot relative to the casters.

Figures 10, 11:
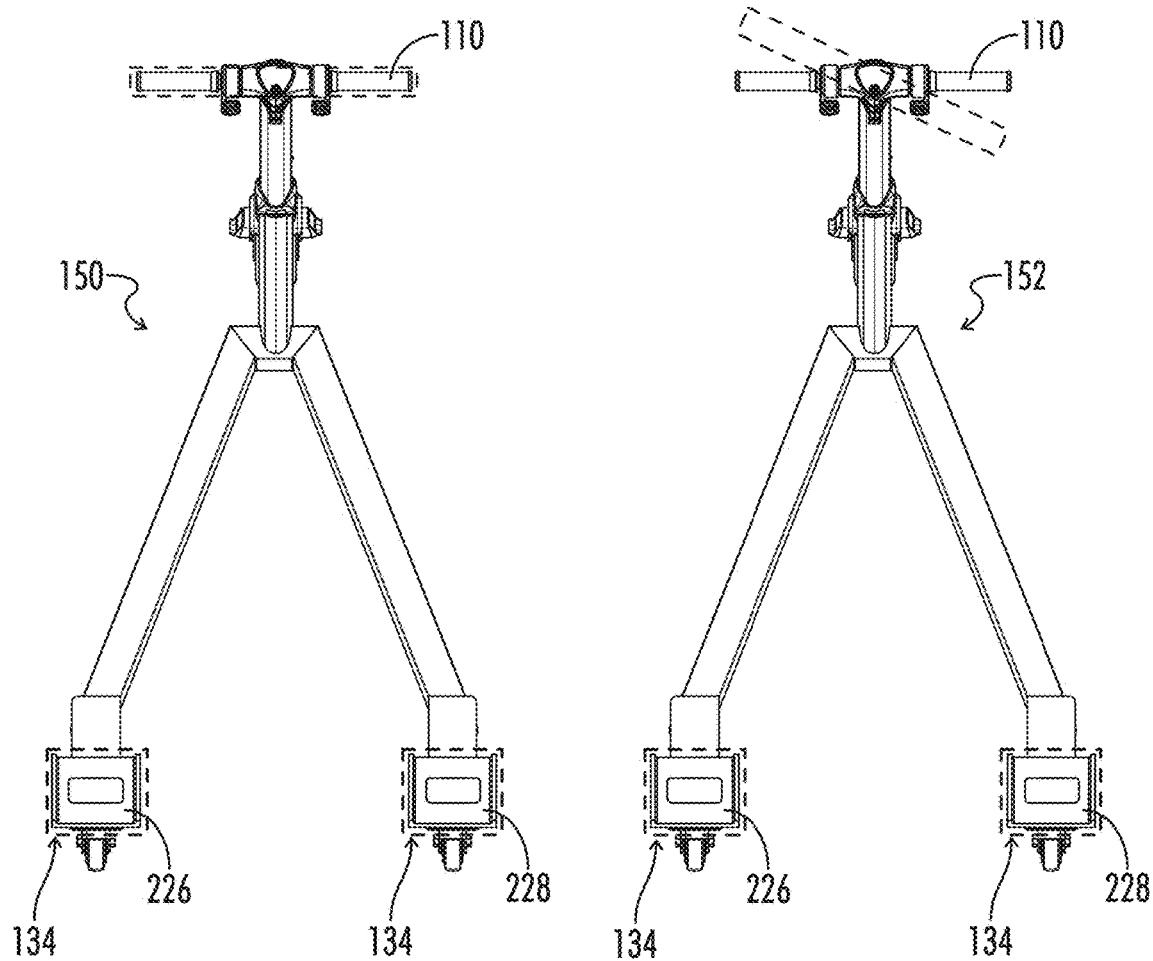
FIG. 10 depicts a plan view of the drift scooter of FIG. 5 in a forward travel arrangement.
FIG. 11 depicts a plan view of the drift scooter of FIG. 5 in a handlebar turning arrangement.

A forward (straight) maneuver 150 configuration is shown in FIG. 10. Here, the handlebar front wheel 104 and the first and second rear wheels 106, 108 all are arranged in a generally forward direction such that rotation of said wheels 104, 106, 108 results in forward progress of the drift scooter 200. According to a turning maneuver 152, shown in FIG. 11, a rider directs the handlebar 110 to one side or the other, and to varying degree, to effect turning of the drift scooter 200. During the turning maneuver 152, similar to most four wheel vehicles (such as most North American automobiles), the first and second rear wheels maintain a generally forward orientation while travelling a further distance along a turning route as compared with the front wheel 104 directing the turning maneuver 152.

Figure 12:
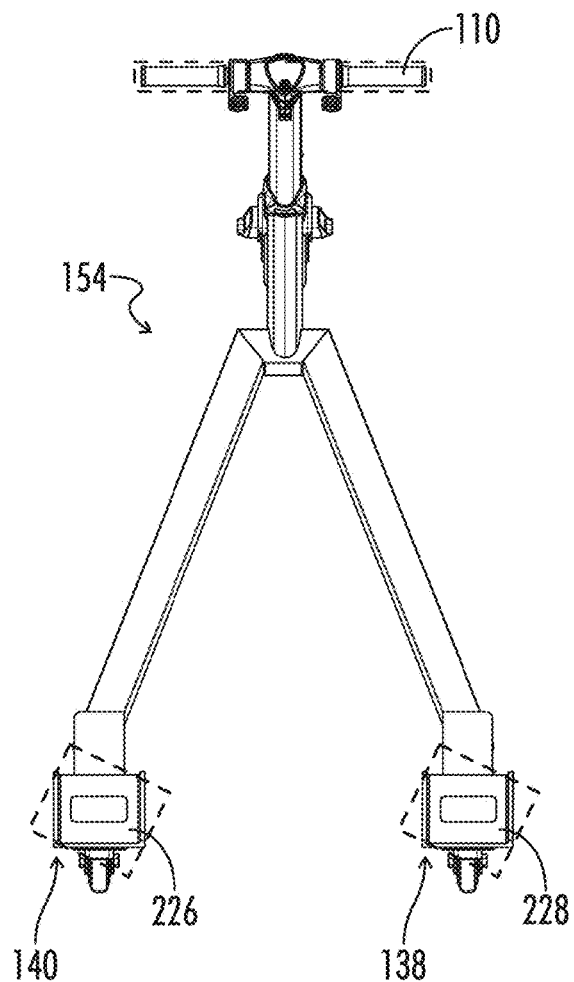
FIG. 12 depicts a plan view of the drift scooter of FIG. 5 in a foot platform turning arrangement.
Figure 13:
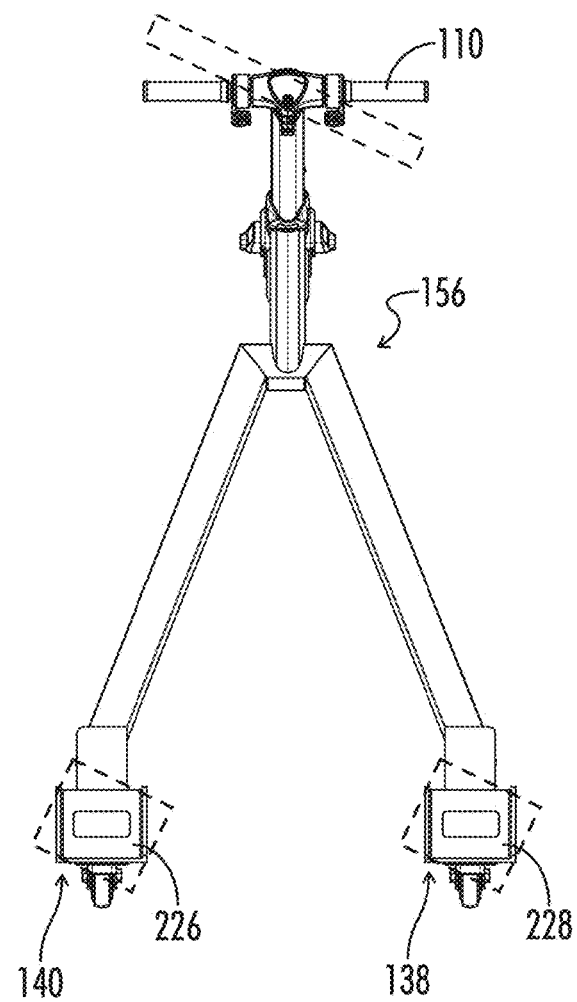
FIG. 13 depicts a plan view of the drift scooter of FIG. 5 in a drift turning arrangement.

The drift scooter 200 may also perform drift maneuvers of varying degree, as described with reference to FIGS. 12 and 13. In FIG. 12, a rider turns both of the first and second foot platforms, and; therefore, both of the first and second rear wheels 106, 108 in a same direction while maintaining a forward-oriented direction of the handlebar 110 to conduct a moderate drift maneuver 154. Further, as shown in FIG. 13, an exaggerated (or extreme) drift maneuver 156 may be performed by a rider turns both of the first and second foot platforms 226, 228, and; therefore, both of the first and second rear wheels 106, 108 in a same direction while simultaneously turning the handlebar 110 to an orientation matching that of the first and second rear wheels 106, 108. The example of FIG. 13 illustrates the exaggerated drift maneuver 156 with all three of the wheels 104, 106, 108 oriented to the right of forward. A similar maneuver may be performed intuitively in the opposing direction.

Figure 14:
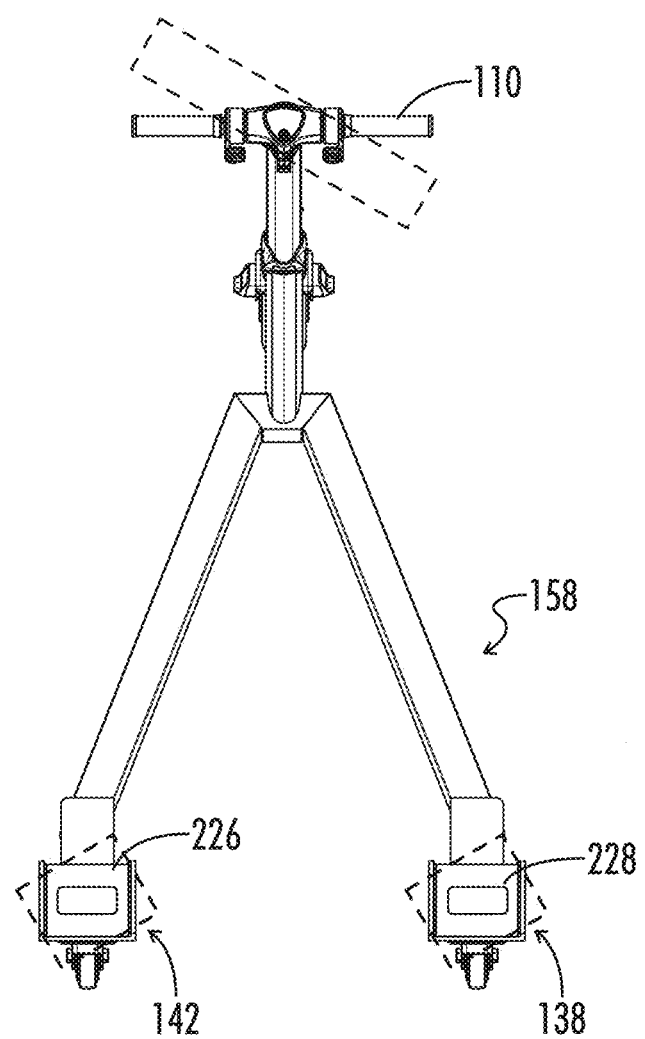
FIG. 14 depicts a plan view of the drift scooter of FIG. 5 in a counter turning arrangement wherein the front wheel and the rear wheels are oriented in different directions.

A tight turning maneuver 158 may be performed by turning the first wheel 104 in a direction different from the first and second rear wheels 106, 108, as illustrated in FIG. 14. Specifically, a rider may turn the first and second foot platforms 226, 228 in a first direction while simultaneously turning the handlebar 110 in an opposing direction to facilitate a tight turning radius that approximates, or approaches, a pivot about an axis disposed between the three wheels 104, 106, 108.

Figure 15:
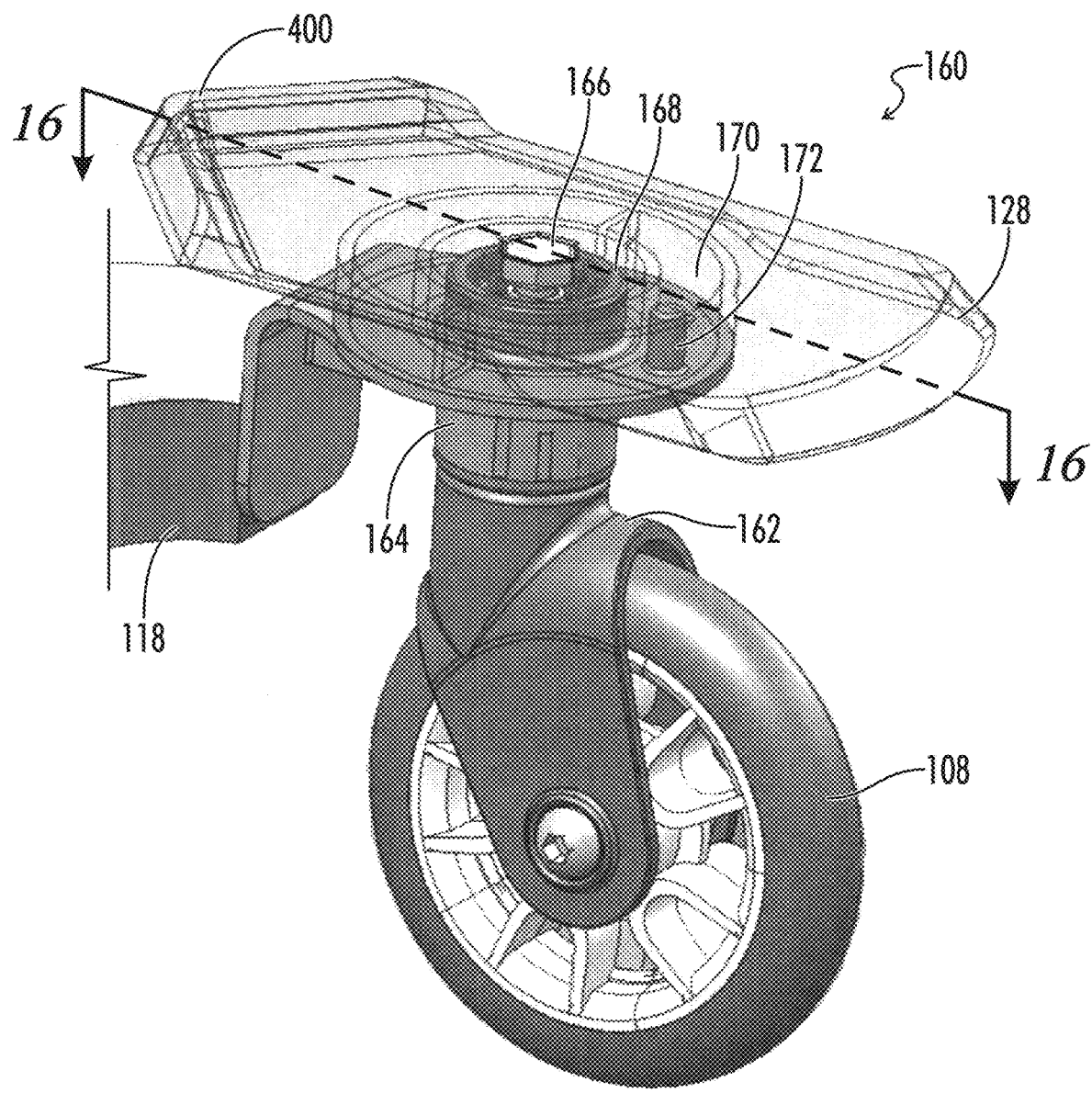
FIG. 15 is an enlarged isometric side view of a rear wheel assembly of the drift scooter of FIG. 1 comprising a rear wheel, coupling caster, and foot platform.
Figure 16:
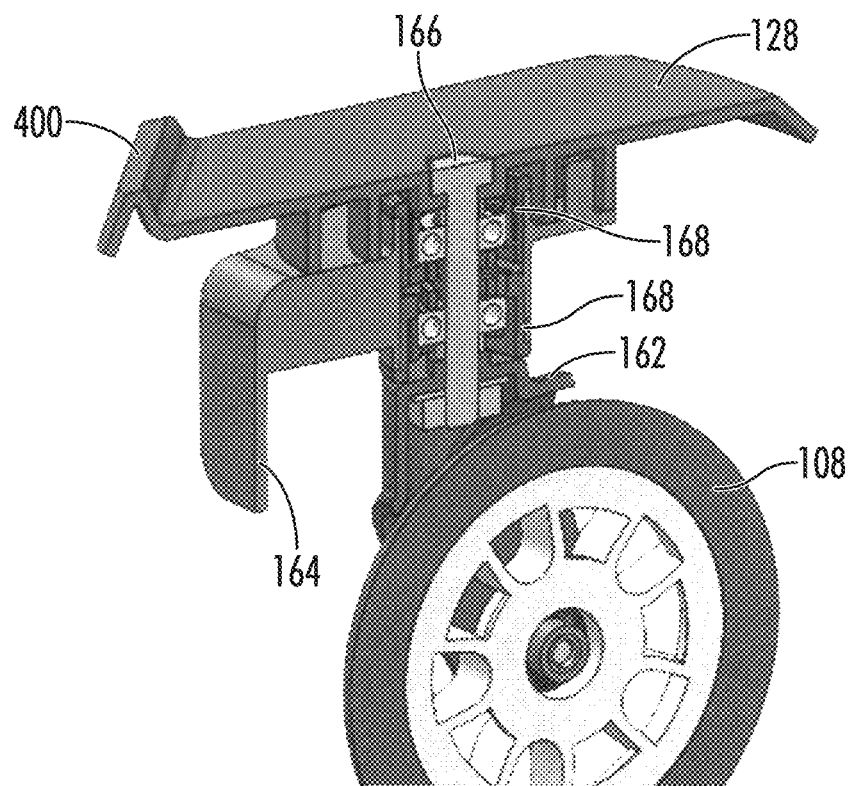
FIG. 16 is a cross-sectional view of the rear wheel assembly taken along plane 16-16 indicated in FIG. 15.
Figure 17:
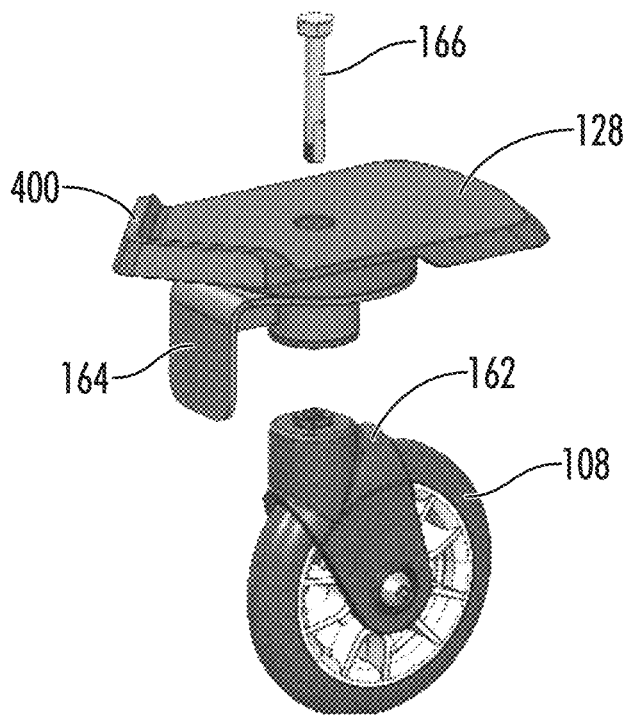
FIG. 17 is an exploded isometric view of the rear wheel assembly of FIG. 15.

FIG. 15 is an enlarged isometric side view of a rear wheel assembly 160 (specifically of the right side, from behind, and corresponding to a right foot of the rider) comprising the rear wheel 108, coupling caster 162, mounting arm 164, and foot platform 128. FIG. 16 is a cross-sectional view of the rear wheel assembly 160 taken along plane 16-16 indicated in FIG. 15 and illustrating a relative location of a coupling screw 166 that couples the coupling caster 162, the mounting arm 164, and the foot platform 128 in a stacked arrangement. The rear wheel 108 is coupled to the coupling caster 162 by an individual wheel axle about which the rear wheel 108 rotates to progress the drift scooter 100. FIG. 17 is an exploded isometric view of the rear wheel assembly 160 illustrating a direction of insertion for the coupling screw 166. A bolt or another coupling component may be substituted for the coupling screw 166. At least one of the foot platforms 126 and 128 may include a wedge-shaped front edge 400. As shown, the wedge shaped front edge 400 may be raised relative to a surface of the corresponding platform 126, 128, thereby forming a partial boundary of the surface.

Figure 18:
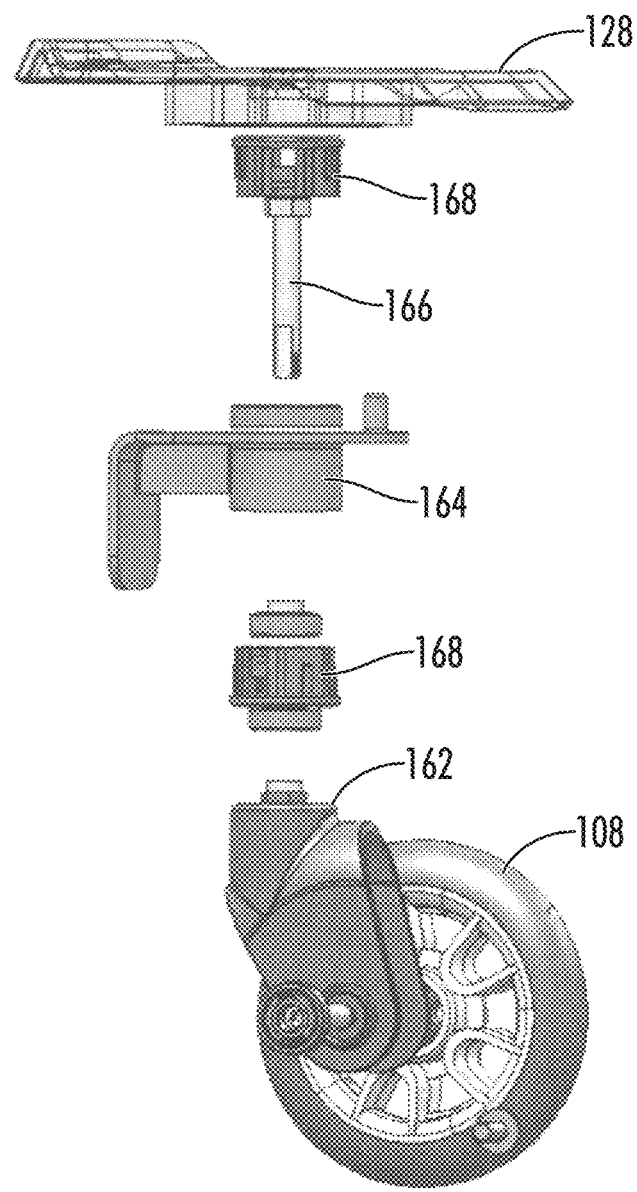
FIG. 18 is an exploded elevational view of the rear wheel assembly of FIG. 15.

FIG. 18 is an exploded elevational view of the rear wheel assembly 160 further detailing the relative locations of connecting bushings 168 arranged to facilitate castering of the rear wheel 108. Two bearings, each held in place by one of the plastic bushings 168, and a hex bolt with a machined flat face that aligns with a similar shape on the caster fork. This maintains alignment of the caster and platform during rotation.

Figure 19:
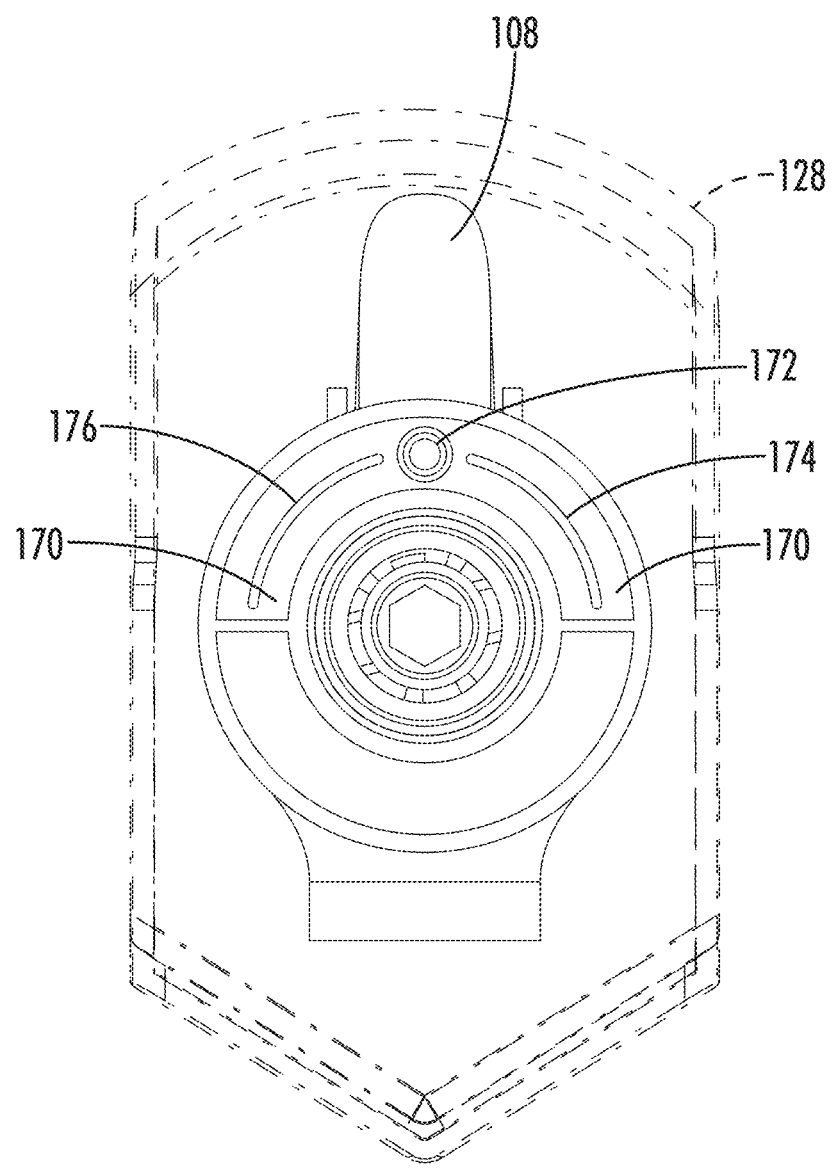
FIG. 19 is a top plan view of the rear wheel assembly of FIG. 15 illustrating the foot platform as partially transparent.
Figure 20:
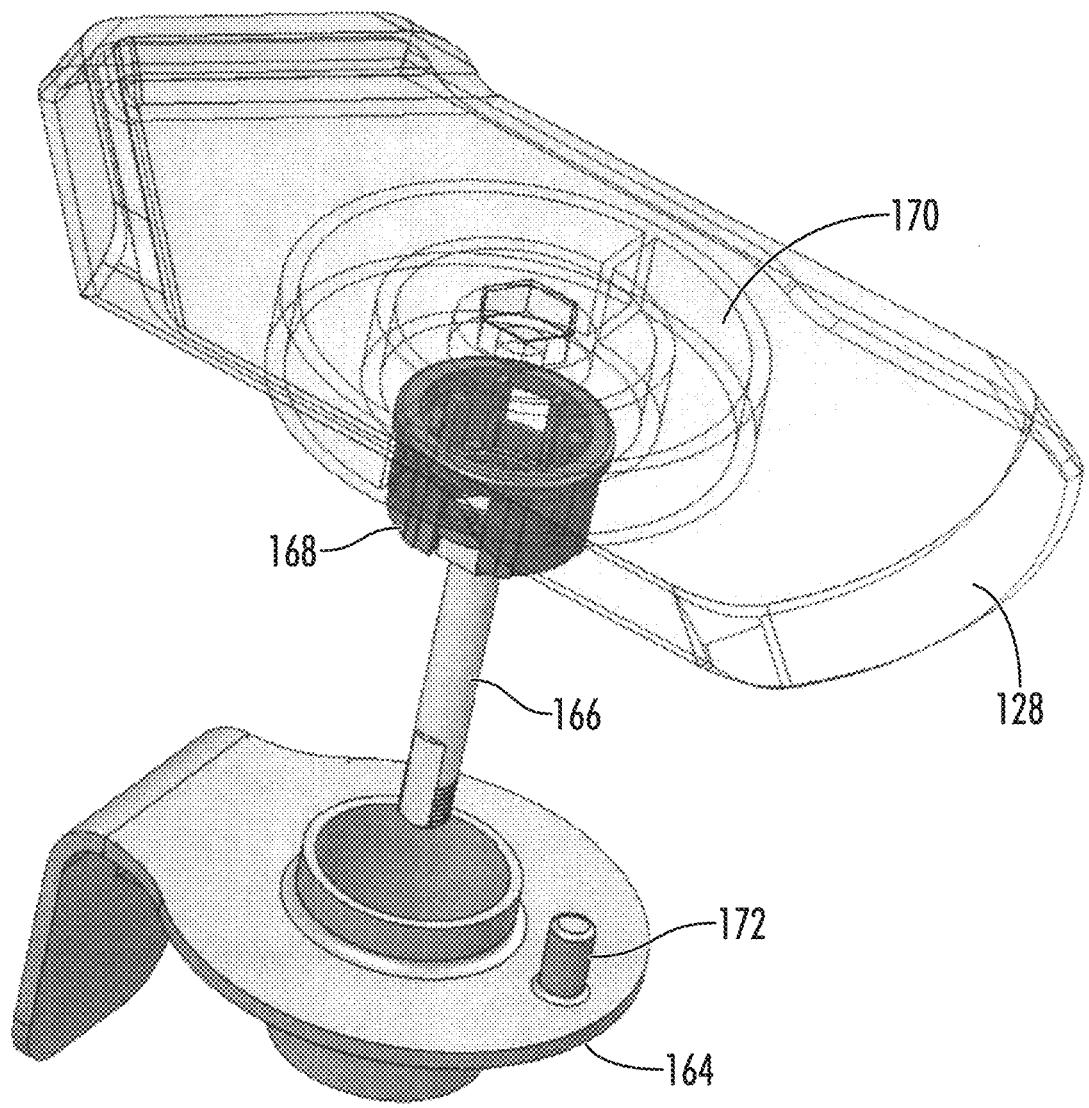
FIG. 20 is an exploded isometric view of the rear wheel assembly of FIG. 15 that omits certain elements, including the rear wheel, to show in further detail a foot platform return mechanism.

FIG. 19 is a plan view of the rear wheel assembly 160 of FIG. 15 illustrating the foot platform 128 as partially transparent. In some embodiments, as shown in FIGS. 19 and 20, at least one of the foot platforms 126 and 128 may pivot from the initial forward position 134 by more than 60 degrees about a pivot axis (which may extend along the screw 166 in the illustrated example) in a clockwise direction. Further, at least one of the foot platforms 126 and 128 may pivot from the initial forward position 134 by more than 80 degrees about the pivot axis in the clockwise direction. Similarly, at least one of the foot platforms 126 and 128 may pivot from the initial forward position 134 by more than 60 degrees about the pivot axis in a counterclockwise direction. Further, at least one of the foot platforms 126 and 128 may pivot from the initial forward position 134 by more than 80 degrees about the pivot axis in the counterclockwise direction. By the foot platforms 126 and 128 pivoting more than 60 or 80 degrees, a tight turning maneuver may be performed. The pivot axis about which the foot platform 128 pivots may overlap with the rear wheel 108 in a plan view.

A distance from the first leg 216 to the second leg 218 is kept constant during pivoting of the respective foot platforms 226 and 228.

In order to provide a substantial pivot range, in some embodiments, the foot platforms 226, 228 are located at a different plane than the first and second legs 216, 218, such that the platform is raised relative to the corresponding leg. Accordingly, the pivot range of each platform 226, 228 may be unobstructed by the corresponding leg 216, 218. While this may allow for a full rotation of the platform and castor relative to the corresponding leg, the rotation may be otherwise limited.

Further, in some embodiments, the casters or the corresponding mounting arm 164, may be mounted to an end of the corresponding first and second leg 216, 218. The rotational axis of the casters may then be located such that a hypothetical extension of each of the first and second legs would intersect the pivot axis of the corresponding castered rear wheel 108.

Figure 32:
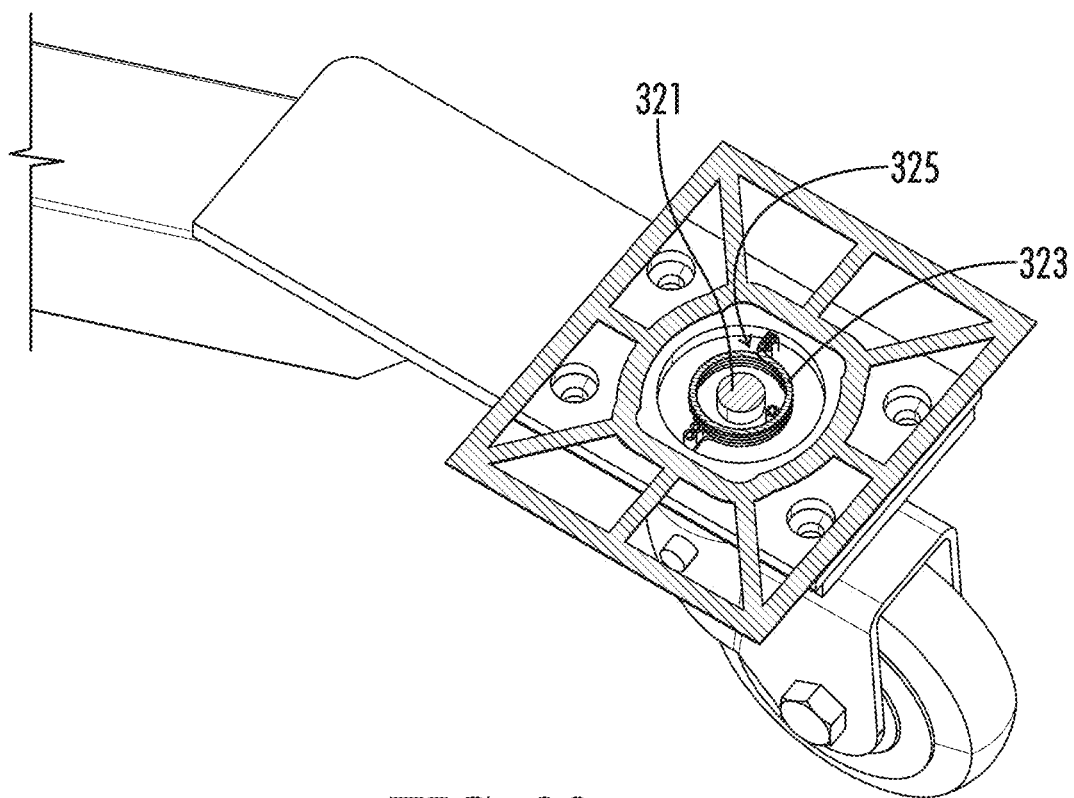
FIG. 32 is a cross-sectional view of a foot platform according to one embodiment.

With reference to FIGS. 19 and 20, interior to the foot platform 128 an arcuate cavity 170 is formed along a perimeter of the mounting arm 164. Within the arcuate cavity 170 is a centrally located post 172. One or more springs 174, 176 may be disposed within the arcuate cavity 170. In an example embodiment, one or more springs 174 and 176 may force one of the foot platforms 126 and 128 to return to the initial forward position 134 from a first turned position in a side of one direction of a clockwise direction and a counterclockwise direction. In addition, the one or more springs forces 174 and 176 may force the one of the foot platforms 126 and 128 to return to the initial forward position 134 from a second turned position in a side of the other direction of the clockwise direction and the counterclockwise direction. In another example embodiment, one or more springs 174, 176 may comprise first and second springs 174, 176 disposed on either side of the post 172 and operable to return the foot platform 128 and the associated rear wheel 108 to the initial forward position 134. Therefore, a rider applies pressure to the foot platform 128 to overcome the spring force of at least one of the first and second springs 174, 176 to turn the rear wheel 108. Upon release of said pressure by a rider, the spring force is unopposed by a foot of the rider and operates to re-align the rear wheel from a turned position (the outwardly angled and/or the inwardly angled positions 136, 138) to the initial forward position 134. This facilitates comfortable and enjoyable maneuverability from a perspective of a rider operating the drift scooter 100, 200. If two springs are used, then the springs 174, 176 are preferably compression springs each being anchored to the post 172 and another point distal to the post along the arcuate cavity 170. According to this configuration, the first and second compression springs 174, 176 counter balance one another and would typically supply balanced (approximately equal) spring forces. Alternatively, one or more torsion springs may be used for self-centering and operatively disposed along the post 172 (e.g., a helical torsion bar with a coil thereof disposed about the post 172 such that torque is applied against interior walls of the arcuate cavity 170). In another embodiment shown in FIG. 32, one or more springs 323, which may include a torsion spring, are disposed in a cavity 325 formed inside one of the foot platforms 126 and 128. A helical portion of the one or more springs 323 is about the post 321.

Figure 24:
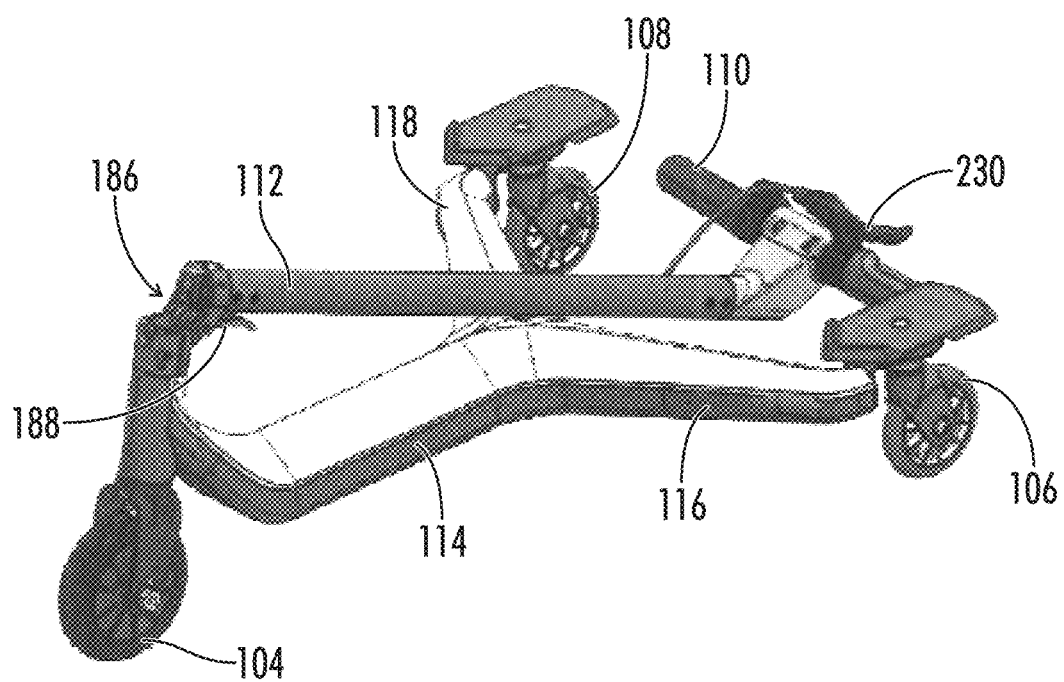
FIG. 24 illustrates an isometric view of the drift scooter of FIG. 1 in the folded position.
Figure 25:
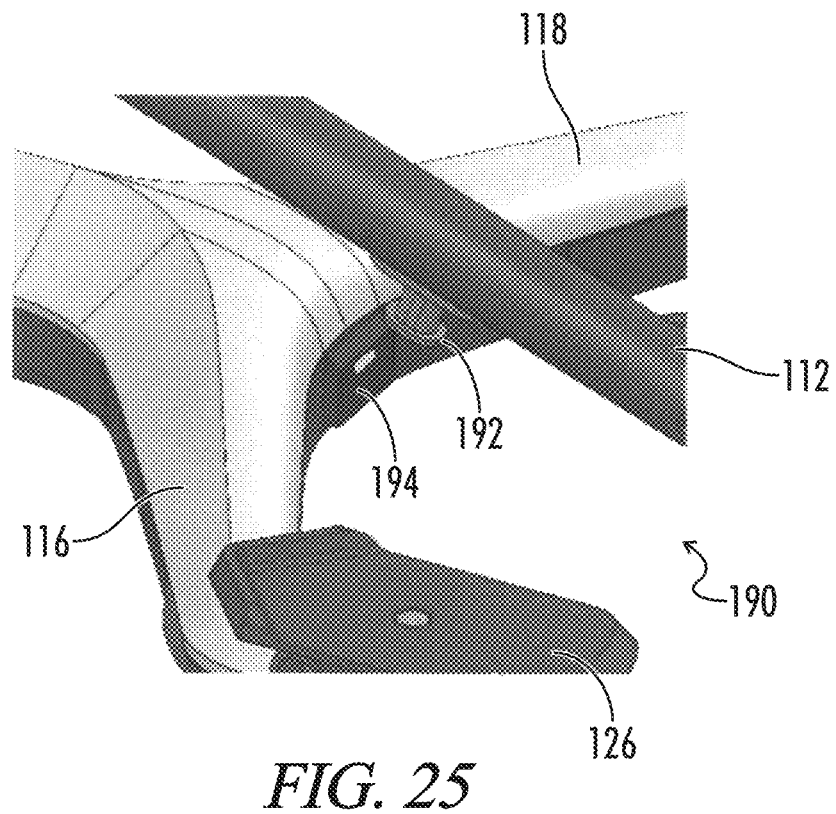
FIG. 25 is an enlarged rear isometric view of a locking mechanism for retaining the drift scooter in the folded position of FIG. 23.
Figure 26:
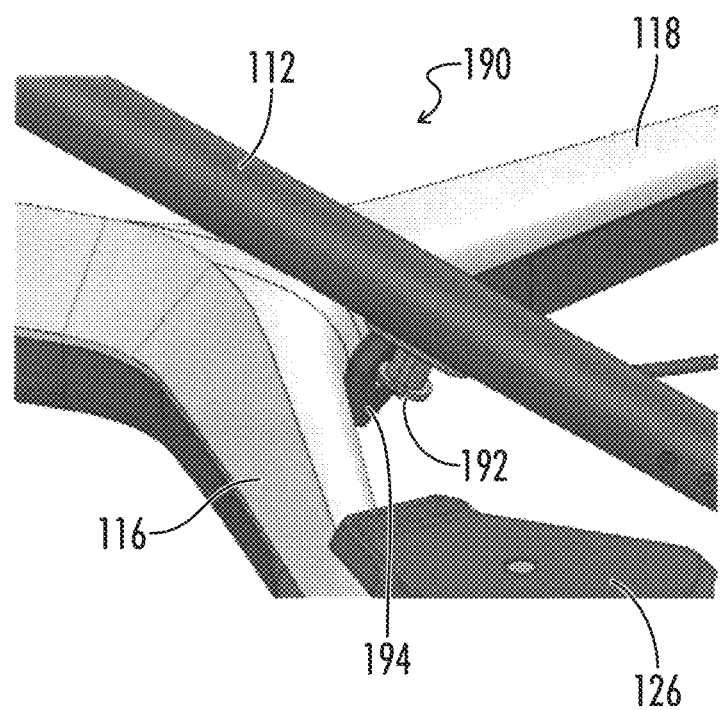
FIG. 26 is an enlarged rear isometric view of the locking mechanism retaining the drift scooter in the folded position of FIG. 23.

Referring now to FIGS. 21-23, a riding position 180, an intermediate position 182, and a folded position 184 of the drift scooter 100 are shown. A break point 186 is disposed along the vertical shaft 112. The break point 186 comprises a hinge 188 and facilitates folding of the drift scooter 100 for convenient transport when not in use. FIG. 24 further illustrates the folded position 184 of the drift scooter 100. The handlebar 110 is disposed proximal and between the rear wheels 106, 108. The drift scooter 100 may lock or be fixedly arranged in either the riding position 180 or the folded position 184. FIG. 25 depicts a locking mechanism 190 for the drift scooter 100 in the folded position 184. A flange 192 may be disposed along the vertical shaft 112 and nearer the handlebar 110 than the front wheel 104 as compared to the break point 186, which is disposed relatively nearer the front wheel 104. The flange 192 snaps into a detent or groove 194 disposed between the first and second rear legs 116, 118 on the body 114 of the drift scooter 100. The flange 192 interacts with the groove 194 to arrest motion of the vertical shaft 112 and retain the drift scooter 100 in the folded position 184. In an example embodiment, the groove 194 may be spring-loaded such that the flange 192 operates to push the groove 194 and associated mounting surface inward until the flange 192 enters the groove 194, releasing the spring, and locking the drift scooter 100 in the folded position 184.

Figure 27:
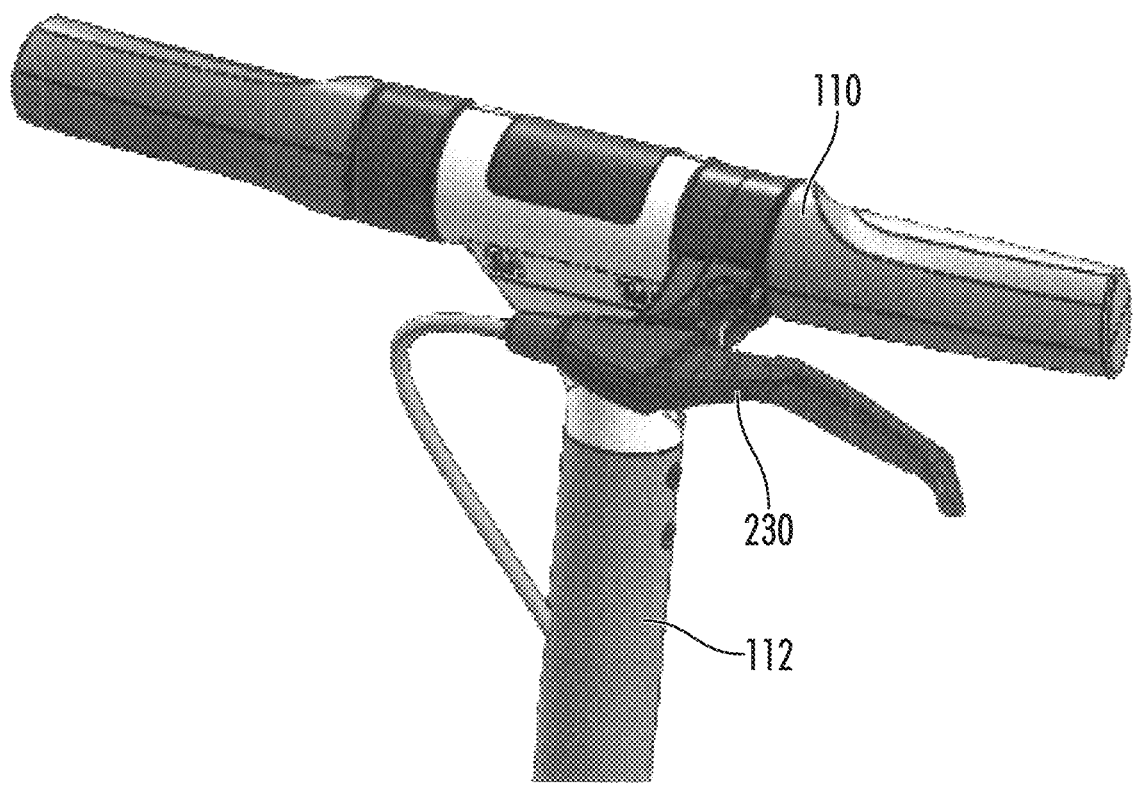
FIG. 27 is an enlarged front isometric view of a handlebar of the drift scooter of FIG. 1.
Figure 28:
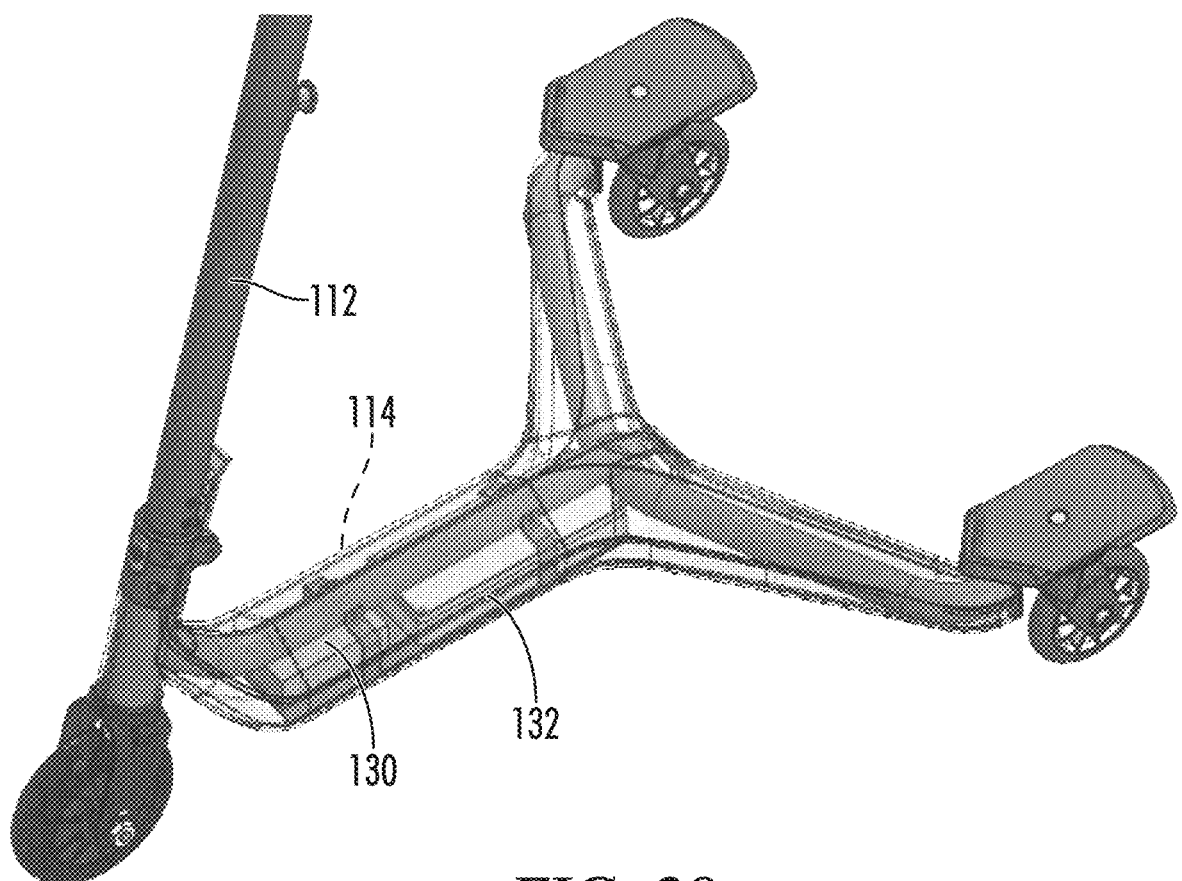
FIG. 28 is a partial isometric view from above of the drift scooter of FIG. 1 illustrating an exterior housing of a drift scooter body as transparent to supply further detail regarding the relative location of a power source and motor controller within the drift scooter body.
Figure 29:
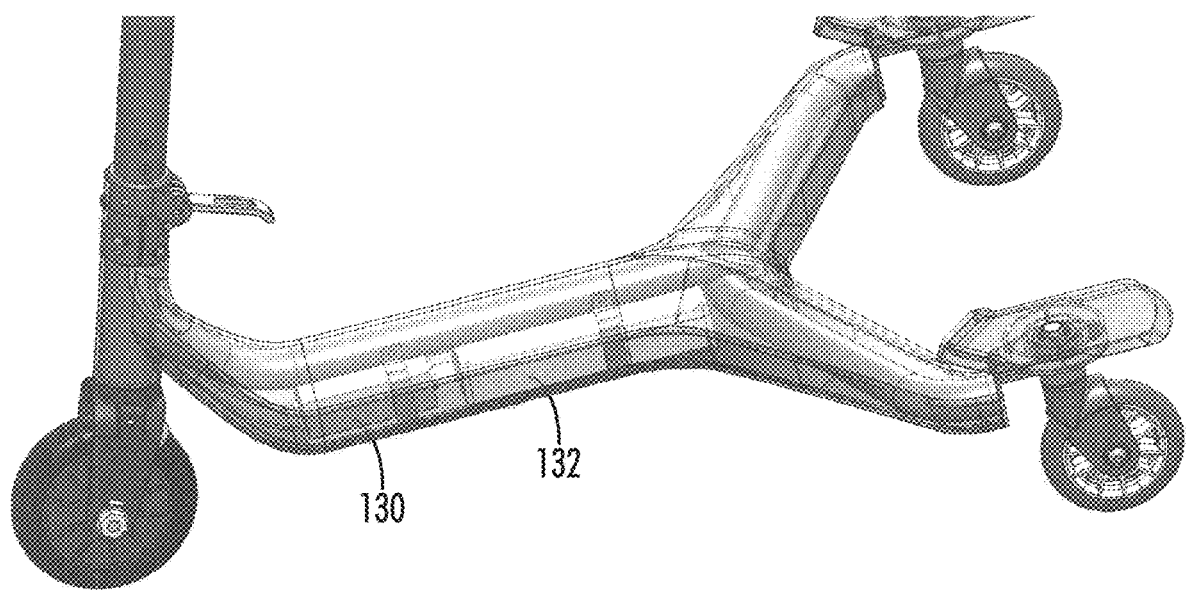
FIG. 29 is an enlarged partial isometric side view of the exterior housing of the drift scooter body as transparent to supply further detail regarding the relative location of the power source and the motor controller within the drift scooter body.
Figure 30:
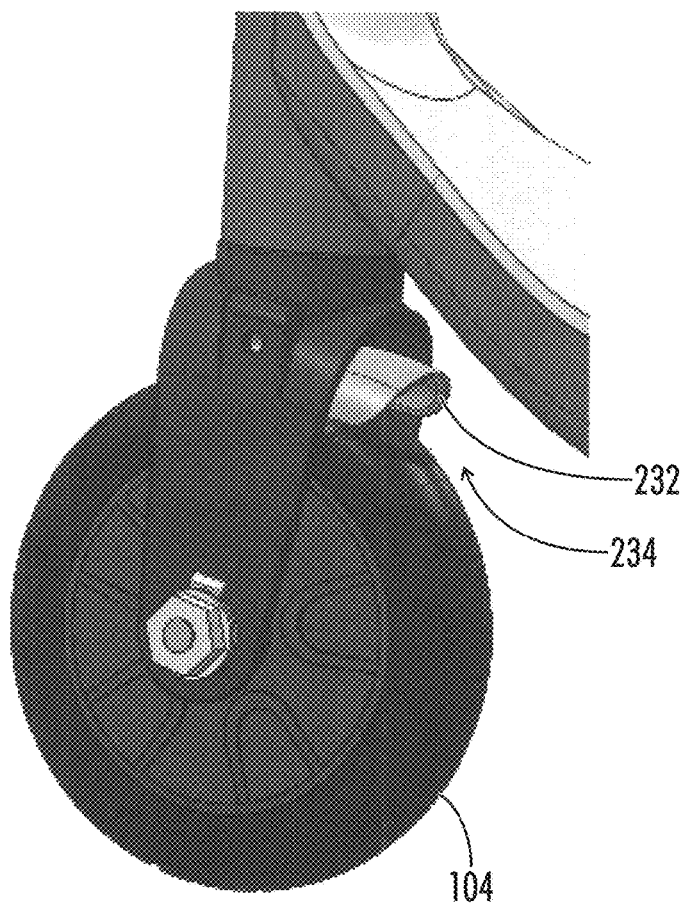
FIG. 30 is an enlarged partial isometric side view of the front wheel of the drift scooter of FIG. 1 illustrating details of a braking mechanism in an initial position.
Figure 31:
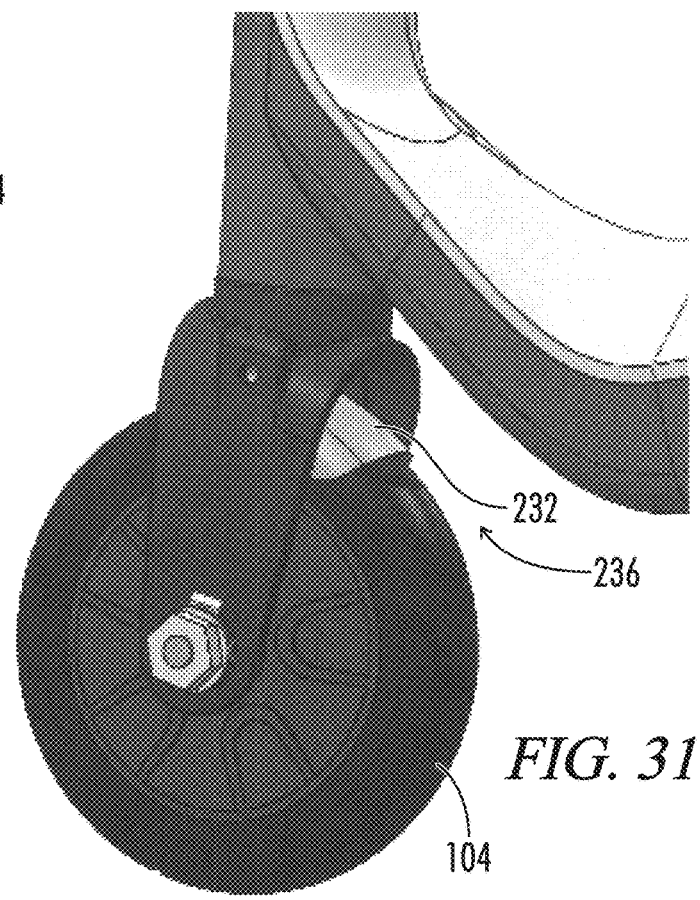
FIG. 31 is an enlarged partial isometric side view of the front wheel of the drift scooter of FIG. 1 illustrating details of the braking mechanism in an applied position.

Referring now to FIG. 27 a hand brake 230 is disposed on the handlebar 110. The hand brake 230 operates a spring-loaded spoon brake 232 disposed proximal a surface of the front wheel 104. Additionally, operation of the hand brake 230 may cease supplying power to the motor and/or motor controller 130. As a result, the spoon brake 232 brakes the drift scooter 100 in cooperation with electric braking. FIG. 30 illustrates the spoon brake in an initial, unapplied position 234, while FIG. 31 illustrates the spoon brake in an applied position 236 making contact with the front wheel 104 and supplying frictional braking thereto.

In some embodiments, instead of, or in addition to, the hand brake 230 shown, a mechanical foot brake may be provided on one or both of the rear wheels.

The embodiment(s) detailed hereinabove may be combined in full or in part, with any alternative embodiment(s) described.

INDUSTRIAL APPLICABILITY

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A drift scooter, comprising:
    handlebars operatively coupled to a front wheel and mounted from a scooter body;
    first and second legs extending from the scooter body;
    first and second castered rear wheels mounted from the respective first and second legs; and
    first and second foot platforms operatively coupled with the respective first and second castered rear wheels wherein the first and second foot platforms pivot,
    wherein the first and second rear wheels are adjusted in response to pivoting of the respective first and second foot platforms, and
    wherein a pivot axis about which the first foot platform pivots overlap with the first rear wheel in a plan view.

2. The drift scooter of claim 1, wherein at least one of the first and second foot platforms pivots from an initial forward position by more than 60 degrees about a pivot axis in a clockwise direction.

3. The drift scooter of claim 2, wherein the at least one of the first and second foot platforms pivots from the initial forward position by more than 80 degrees about the pivot axis in the clockwise direction.

4. The drift scooter of claim 3, wherein the at least one of the first and second foot platforms pivots from the initial forward position by more than 60 degrees about the pivot axis in a counterclockwise direction.

5. The drift scooter of claim 4, wherein the at least one of the first and second foot platforms pivots from the initial forward position by more than 80 degrees about the pivot axis in the counterclockwise direction.

6. The drift scooter of claim 1, further comprising one or more springs that forces one of the first and second foot platforms to return to an initial forward position from a first turned position in a side of one direction of a clockwise direction and a counterclockwise direction.

7. The drift scooter of claim 6, wherein the one or more springs forces the one of the first and second foot platforms to return to the initial forward position from a second turned position in a side of the other direction of the clockwise direction and the counterclockwise direction.

8. The drift scooter of claim 6, wherein the one or more springs are disposed under the one of the first and second foot platforms.

9. A drift scooter comprising:
    handlebars operatively coupled to a front wheel and mounted from a scooter body;
    first and second legs extending from the scooter body;
    first and second castered rear wheels mounted from the respective first and second legs;
    first and second foot platforms operatively coupled with the respective first and second castered rear wheels wherein the first and second foot platforms pivot, and
    one or more springs forces one of the first and second platforms to return to an initial forward position from a first turned position in a side of one direction of a clockwise direction and a counter-clockwise direction,
    wherein the first and second rear wheels are adjusted in response to pivoting of the respective first and second foot platforms, and
    wherein a cavity is formed inside the one of the first and second foot platforms, and the one or more springs are disposed in the cavity.

10. The drift scooter of claim 1, further comprising a motor operably coupled with the front wheel.

11. The drift scooter of claim 1, wherein a distance from the first leg to the second leg is kept constant during pivoting of the respective first and second foot platforms.

12. The drift scooter of claim 1, wherein one of the first foot platform pivots symmetrically from an initial forward position in a clockwise direction and in a counterclockwise direction.

13. The drift scooter of claim 1, wherein at least one of the first and second foot platforms includes a wedge shaped front edge.

14. A drift scooter comprising:
    handlebars operatively coupled to a front wheel and mounted from a scooter body;
    first and second legs extending from the scooter body,
    first and second castered rear wheels mounted from the respective first and second legs; and
    first and second foot platforms operatively coupled with the respective first and second castered rear wheels wherein the first and second foot platforms pivot,
    wherein the first and second rear wheels are adjusted in response to pivoting of the respective first and second foot platforms
    wherein at least one of the first and second foot platforms includes a wedge shaped front edge, and
    wherein the wedge shaped front edge is raised relative to a surface of the corresponding platform and forms a partial boundary of the surface.

15. The drift scooter of claim 1, wherein each of the first and second foot platforms further comprises two sidewalls raised relative to a surface of the corresponding platform, and wherein the two sidewalls are on opposite sides of the corresponding platforms, thereby forming a partial boundary restrict lateral movement on the platform.

16. A drift scooter comprising:
    handlebars operatively coupled to a front wheel and mounted from a scooter body;
    first and second legs extending from the scooter body;
    first and second castered rear wheels mounted from the respective first and second legs; and
    first and second foot platforms operatively coupled with the respective first and second castered rear wheels wherein the first ad second foot platforms pivot,
    wherein the first and second rear wheels are adjusted in response to pivoting of the respective first and second foot platforms, and
    wherein a pivot range of each of the first and second foot platforms is not obstructed by the corresponding first or second leg.

17. The drift scooter of claim 1, wherein an extension of each of the first and second legs intersects a pivot axis of the corresponding first and second castered rear wheel.

18. The drift scooter of claim 1, wherein the handlebar is fixed relative to the front wheel by a shaft, and wherein the shaft is vertical in a riding configuration, and wherein the shaft pivots relative to the front wheel to a storage configuration, and wherein, in the storage configuration, the handlebar is located between the first and second rear wheels.

* * * * *